US007053316B2

(12) United States Patent
Mürdter

(10) Patent No.: US 7,053,316 B2
(45) Date of Patent: May 30, 2006

(54) WIRELESS WEIGHING DEVICE COMPRISING A PLURALITY OF FUNCTIONAL UNITS

(75) Inventor: Herbert Mürdter, Albstadt (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 155 days.

(21) Appl. No.: 10/467,530

(22) PCT Filed: Feb. 7, 2002

(86) PCT No.: PCT/EP02/01285

§ 371 (c)(1),
(2), (4) Date: Dec. 12, 2003

(87) PCT Pub. No.: WO02/063255

PCT Pub. Date: Aug. 15, 2002

(65) Prior Publication Data

US 2004/0129461 A1    Jul. 8, 2004

(30) Foreign Application Priority Data

Feb. 7, 2001    (DE)    ................................ 101 05 535

(51) Int. Cl.
*G01G 19/414* (2006.01)

(52) U.S. Cl. .................. 177/25.13; 705/414; 235/383; 340/666

(58) Field of Classification Search .. 177/25.11–25.19; 705/414–416
See application file for complete search history.

(56) References Cited

U.S. PATENT DOCUMENTS 4,969,112 A    11/1990   Castle ......................... 702/173

(Continued)

FOREIGN PATENT DOCUMENTS

JP          55093026 A    *  7/1980    ................. 705/414

OTHER PUBLICATIONS

JP 10 073475 A (Kubota Corp), Mar. 17, 1998.

(Continued)

*Primary Examiner*—Randy W. Gibson
(74) *Attorney, Agent, or Firm*—Friedrich Kueffner

(57) ABSTRACT

A weighing device for handling sales transactions in a retail store, with several functional units, each one among the functional units being linked to at least another one among the functional units by a signal communications system. At least one of unit has a load cell for producing an electric signal proportional to the weight of an object placed on the load cell for weighing. At least one unit has an evaluation unit for forming a weight value expressed in a system of units from the weight signal supplied via the given signal communications system. At least one unit has a display unit for displaying the weight value and a total price of the object supplied via the given signal communications system. Also, at least one unit has a control unit for memorizing an article number and an associated unit price of the object and for controlling the operation of the weighing device so as to calculate the total price by multiplication of the unit price with the weight value after the article number is entered. At least two among the functional units having the load cell, the evaluation unit, the display unit, and the control unit are spatially separated from each other in the retail store, and their signal communications system, which serves to maintain the flow of signals connected with the handling of the sales transactions, is executed wirelessly.

6 Claims, 1 Drawing Sheet

U.S. PATENT DOCUMENTS

| | | | |
|---|---|---|---|
| 5,052,504 A * | 10/1991 | Ikeda et al. | 705/21 |
| 5,121,328 A * | 6/1992 | Sakai et al. | 705/407 |
| 5,153,585 A * | 10/1992 | Negishi et al. | 340/870.28 |
| 5,250,789 A * | 10/1993 | Johnsen | 705/14 |
| 5,361,871 A * | 11/1994 | Gupta et al. | 186/61 |
| 6,006,100 A | 12/1999 | Koenck et al. | 455/466 |
| 6,080,938 A * | 6/2000 | Lutz | 177/25.15 |
| 6,131,814 A * | 10/2000 | Swartz | 235/472.01 |
| 6,189,789 B1 * | 2/2001 | Levine et al. | 235/383 |
| 6,875,932 B1 * | 4/2005 | Tuft | 177/25.13 |
| 6,919,516 B1 * | 7/2005 | Frye et al. | 177/25.13 |
| 2003/0173118 A1 * | 9/2003 | Schuller | |
| 2004/0041021 A1 * | 3/2004 | Nugent, Jr. | |

OTHER PUBLICATIONS

Patent Abstracts OJ Japan, JP 62062223 A, Mar. 1987, Tanita:KK.

* cited by examiner

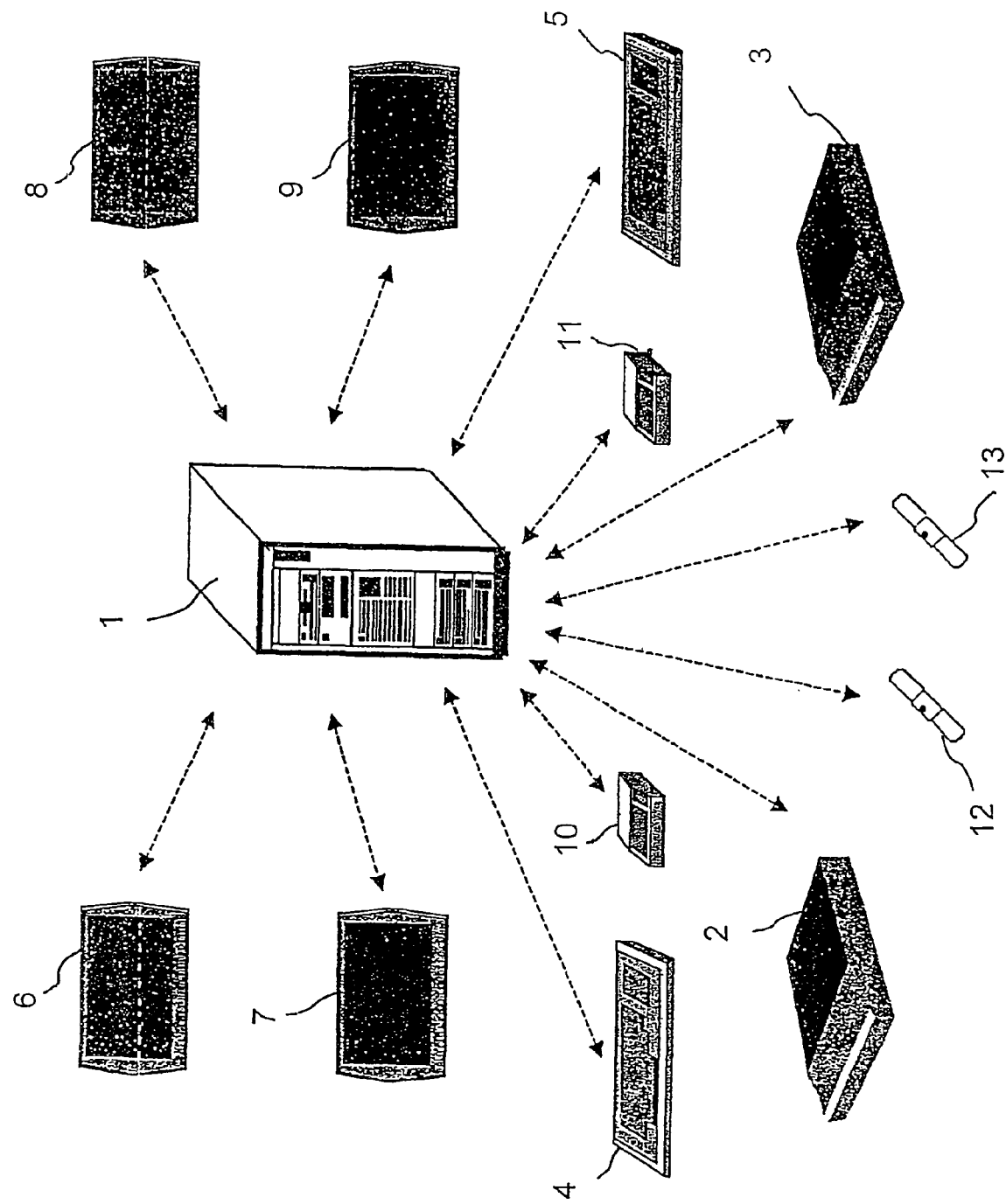

WIRELESS WEIGHING DEVICE COMPRISING A PLURALITY OF FUNCTIONAL UNITS

The invention concerns a weighing device with several functional units, at least two of which are linked to each other by a signal communications system, and at least one of which has a load cell for producing an electrical signal proportional to the weight of an object placed on the load cell for weighing, at least one has an evaluation unit for forming a weight value expressed in a system of units from the weight signal supplied via the given signal communications system, at least one has a display unit for displaying the weight value supplied via the given signal communications system, and at least one has a control unit for controlling the operation of the weighing device.

In weighing devices of this type, the user carries out the weighing operation by placing the object to be weighed on the functional unit that contains the load cell. The weight value, expressed, for example, in the metric system of units, is formed from the output signal of the load cell in the functional unit that contains the evaluation unit and is displayed in the functional unit that contains the display unit. The sequence of these and possibly other available functionalities proceeds under the control of the control unit. Depending on the use of the weighing device as a self-service scale to be operated by a customer or as a retail sales scale to be operated by sales personnel, and depending on the particular circumstances at the given retail store, it may be desired that the individual functionalities be placed in spatially separated places, where they are most favorably situated for the customer or the sales personnel. However, on the one hand, this conflicts with the fact that, to operate the weighing device, the flow of signals between the functional units of the weighing device must be maintained. On the other hand, the installation of signal or data lines for the transmission of signals is expensive and disruptive.

The object of the invention is to create a weighing device of the type mentioned at the beginning, which allows obstacle-free positioning of functionalities that conforms to the wishes of the user.

In accordance with the invention, this object is achieved by spatially separating at least two of the functional units and designing their signal communications to be wireless. The spatial separation of the functional units allows them to be positioned in places that are ergonomically favorable. As a result of the wireless design of the signal communications system, expensive and disruptive signal or data cable does not need to be laid or installed. Wireless signal communications systems that are suitable for this purpose are well known in the state of the art, for example, the standards IEEE 802.11 (Wireless LAN), Bluetooth, IrdA or the like.

This disassembly of the weighing device into functional units that are wirelessly connected with one another results in especially high flexibility of the weighing device with respect to its adaptability to different local conditions and types of applications. This includes the fact that the weighing device can have several display devices in several functional units, which are separated from one another and can be operated from one and the same load cell. The load cell can then be jointly used by several sales personnel, whereas each customer is assigned his own display unit in a spatially separated arrangement. This type of multiple use is conceivable not only for the load cells, but also for functional units with other functionalities, such as printers. Furthermore, functional units can be redundantly provided in a flexible way, which eliminates the problem of operational shutdowns in the event of disruptions.

If, beyond the avoidance of expensive data cables, cable connections to functional units are to be avoided altogether, power cords, which are used to supply power and in themselves are not very disruptive, can be eliminated by providing a network-independent energy source in the given functional units, for example, a battery or a solar energy source.

It goes without saying, that the maximum spatial separation of the functional units and the range of the corresponding wireless signal communication system must be in conformity with each other. Where very extensive installations are concerned, it may be convenient or necessary in this respect to install repeaters in a number of locations. Examples of the types of wireless communications systems that may be used are radio communications and infrared communications.

An advantageous embodiment provides that the functional unit that contains the control unit is incorporated in a central data processing unit, whose signal communications with at least some of the functional units are wireless. Since in this case several functional units share the central data processing unit, this reduces both the logical input and the equipment expense. This central data processing unit (computer) may also be duplicated for redundancy reasons, which greatly increases the operational reliability of the weighing device.

For a large group of applications, it is convenient to design the weighing device in such a way that the functional unit that contains the load cell is installed on the top of a sales counter, and the functional unit that contains the display unit and that is wirelessly connected to the functional unit that contains the load cell is installed on the glazing of a display window of the sales counter. The functional unit with the load cell may stand on the countertop or be integrated into the countertop. The display unit may be directly incorporated in the glazing of the display window.

In most cases, it is also advantageous for a functional unit that contains an input keyboard to be linked with at least one of the other functional units by wireless signal communications. This enables the operator to take his operating keyboard to wherever it is ergonomically favorable to use.

It is similarly advantageous for at least one functional unit that has a printer to be linked with at least one of the other functional units by wireless signal communications. In this way, the printer can be positioned as a portable unit, for example, in an ergonomically suitable place on a sales counter. On the other hand, it is also possible to place the printer on a checkout counter of a retail business or to integrate it in the checkout counter.

In accordance with the invention, it is also provided that at least one functional unit that contains a transponder be linked with at least one of the other functional units by wireless communications. For example, each member of the sales staff can be given this type of transponder functional unit, which is interrogated by one of the functional units, for example, the functional unit that contains the control unit, and, in response to this interrogation, transmits the salesperson's personal identification code, which is stored in the transponder, and the weighing device that is being used. In this way, on the one hand, the access authorization of the given individual for the weighing device can be automatically verified, and, on the other hand, the sales transaction this individual has handled with the use of the weighing device can be assigned to him/her.

Additional features, details, and advantages of the invention are apparent from the following description and from the drawing, which is a schematic representation of an embodiment of the invention.

In the embodiment of a weighing device shown in the drawing, a central functional unit 1 is linked with several other functional units by wireless signal communications, which are symbolized in the drawing by broken double-headed arrows. The central functional unit 1 is implemented on a central computer and contains especially a control unit for the operational sequences of the weighing device.

The other functional units include two weighing platforms 2, 3, which, for example, are placed on the top of a sales counter (not shown) or are integrated in the countertop. Each of the weighing platforms 2, 3 has a load cell, which converts the weight of an object placed on the weighing platform to a corresponding electric weight signal. The usually analog weight signal is preprocessed and digitized in the weighing platform 2, 3. The digitized value is relayed to the central functional unit by the associated wireless signal link. The central functional unit 1 has an evaluation unit, which receives the digitized value and uses it to generate a weight value expressed in a specific system of units. However, the central functional unit 1 and the weighing platforms 2, 3 can interface differently from this example. For example, evaluation units may be provided in the weighing platforms 2, 3 themselves, so that a complete weight value in the selected system of units is already transmitted to the central functional unit 1.

Among the other functional units there are also two input keyboards 4, 5, with which information relevant to the operational sequence, such as data, e.g., item numbers, unit prices, total prices or the like, and/or commands, can be input into the central functional unit 1. The central functional unit 1 contains, for example, stored unit price data for each item number, which are multiplied by the weight values transmitted from the weighing platforms 2, 3 to produce the total sales price for the given item that is being weighed. The input keyboards 4, 5 can be placed, for example, on the top of a sales counter or on a checkout counter of the retail store.

Among the other functional units there are also four visual display units, 6, 7, 8, and 9. The visual display data produced and output by the central functional unit 1 as a function of the inputs of the weighing platforms 2, 3 and the input keyboards 4, 5 are displayed on these visual display units. In this regard, the visual display units 6 and 8 are used to display the display data intended for the customer, for example, total weight, unit price, and total price of the item that is being weighed. Therefore, these visual display units 6, 8 are installed in places that can be readily viewed by the customer, for example, in the glazing of a display window of a sales counter. On the other hand, the visual display units 7 and 9, which are associated with the visual display units 6 and 8, respectively, are intended to be viewed by the salesperson. Data relevant to the salesperson, i.e., data relating to the sales transactions shown on the visual display units 6 and 8, respectively, are displayed on these visual display units. Therefore, they are installed in places that are ergonomically favorable for the salesperson.

The other functional units also include two printers 10, 11, with which, for example, sales receipts, price labels, tags, or the like can be printed out in connection with the sales transactions handled on the weighing device. These printers may, for example, be set up on the sales counter or checkout counter, or, for example, they may also be integrated in the checkout counter.

Finally, the other functional units include two transponders 12, 13, which are interrogated by the central functional unit 1 via the corresponding wireless signals communications. In response to the interrogation, the transponders 12, 13 transmit personal identification information stored in them to the central functional unit 1. The central functional unit 1 can then allow the individual identified in this way, for example, a salesperson, to have access to the various functions of the weighing device.

In the embodiment shown here, all of the signal communications between the functional units are designed to be wireless. Alternatively, however, it is also possible for some of these signal communications to be wired, provided that this does not impair the desired flexibility and ergonomics of the weighing device. It should also be considered that, in the embodiment shown here, each of the functional units is provided with a single functionality. However, this is not necessary. For example, two or more functionalities could be implemented in one or more of the functional units, for example, a combination of keyboard function and visual display function.

Naturally, in addition to the functional units specified in the specific embodiment, other functional units may also be provided and wirelessly linked, for example, modems, card readers, scanners, telephones, or the like.

The invention claimed is:

1. Weighing device for handling sales transactions in a retail store, with several functional units, each one among said functional units being linked to at least another one among said functional units by a signal communications system, and at least one of which (2, 3) has a load cell for producing an electric signal proportional to the weight of an object placed on the load cell for weighing, at least one (1) has an evaluation unit for forming a weight value expressed in a system of units from the weight signal supplied via the given signal communications system, at least one (6, 7, 8, 9) has a display unit for displaying the weight value and a total price of said object supplied via the given signal communications system, and at least one (1) has a control unit for memorizing an article number and an associated unit price of said object and for controlling the operation of the weighing device so as to calculate said total price by multiplication of said unit price with said weight value after said article number is entered, wherein at least two among said functional units having said load cell, said evaluation unit, said display unit, and said control unit are spatially separated from each other in the retail store, and their signal communications system, which serves to maintain the flow of signals connected with the handling of the sales transactions, is executed wirelessly.

2. Weighing device in accordance with claim 1, wherein the functional unit (1) that contains the control unit is incorporated in a central data processing unit, whose signal communications with at least some of the functional units are executed wirelessly.

3. Weighing device in accordance with claim 1 or claim 2, wherein the functional unit (2, 3) that contains the load cell is installed on the top of a sales counter, and the functional unit (6, 8) that contains the display unit and that is wirelessly connected with this functional unit is installed on the glazing of a display window of the sales counter.

4. Weighing device in accordance with claim 1, wherein a functional unit that contains an input keyboard (4, 5) is linked with at least one of the other functional units by a wireless signal communications system.

5. Weighing device in accordance with claim 1, wherein at least one functional unit that contains a printer is linked with at least one of the other functional units by a wireless signal communications system.

6. Weighing device in accordance with claim 1, wherein at least one functional unit that contains a transponder (12, 13) is linked with at least one of the other functional units by a wireless signal communications system.

* * * * *